(12) United States Patent
Shelton et al.

(10) Patent No.: US 7,286,766 B2
(45) Date of Patent: Oct. 23, 2007

(54) FREE SPACE OPTICAL COMMUNICATION SYSTEM WITH POWER LEVEL MANAGEMENT

(75) Inventors: J. Christopher Shelton, Los Gatos, CA (US); Malcolm J. Northcott, Felton, CA (US); Raymond W. Tang, Cupertino, CA (US)

(73) Assignee: AOptix Technologies, Inc., Campbell, CA (US)

( * ) Notice: Subject to any disclaimer, the term of this patent is extended or adjusted under 35 U.S.C. 154(b) by 0 days.

(21) Appl. No.: 10/417,471

(22) Filed: Apr. 15, 2003

(65) Prior Publication Data
US 2004/0141752 A1    Jul. 22, 2004

Related U.S. Application Data

(60) Provisional application No. 60/440,793, filed on Jan. 16, 2003.

(51) Int. Cl.
*H04B 10/00* (2006.01)

(52) U.S. Cl. .................. 398/119; 398/120; 398/123; 398/131; 398/125

(58) Field of Classification Search .......... 398/15, 398/116, 118, 131, 94, 156, 119, 120, 121, 398/123, 124
See application file for complete search history.

(56) References Cited

U.S. PATENT DOCUMENTS

| | | | |
|---|---|---|---|
| 4,128,309 A | 12/1978 | Lehureau et al. | |
| 4,257,686 A | 3/1981 | Albertinetti et al. | |
| 4,298,247 A | 11/1981 | Michelet et al. | |
| 4,420,222 A | 12/1983 | Bret et al. | |
| 4,588,268 A | 5/1986 | Aldrich | |
| 4,949,056 A | 8/1990 | Akkapeddi | |
| 5,030,004 A | 7/1991 | Grant et al. | |
| 5,042,922 A * | 8/1991 | Pepper | 349/17 |
| 5,051,571 A | 9/1991 | Brown et al. | |
| 5,065,455 A | 11/1991 | Ito et al. | |
| 5,090,795 A * | 2/1992 | O'Meara et al. | 359/240 |
| 5,204,847 A | 4/1993 | Tayefeh | |
| 5,229,593 A * | 7/1993 | Cato | 398/129 |
| 5,229,889 A | 7/1993 | Kittell | |

(Continued)

FOREIGN PATENT DOCUMENTS

| | | |
|---|---|---|
| FR | 2 389 143 | 11/1978 |
| GB | 2 247 323 A | 2/1992 |
| WO | WO97/12267 | 4/1997 |
| WO | WO 01/52450 A2 | 7/2001 |

OTHER PUBLICATIONS

Chellabi, A. et al., "A New Control Algorithm for Bimorph Mirrors," *Systems, Man, and Cybernetics*, 1995, Intelligent Systems for the 21st Century. IEEE International Conference on, vol. 1 (1995), pp. 569-573.

(Continued)

*Primary Examiner*—Dalzid Singh
(74) *Attorney, Agent, or Firm*—Fenwick & West LLP

(57) ABSTRACT

A free space optical communication system includes an adaptive optical power regulator. The adaptive optical power regulator adapts to changes in effective loss associated with the free space optical path. In one embodiment the adaptive optical power regulator adapts to scintillation losses. In another embodiment, the adaptive optical power regulator further adapts to changes in atmospheric loss associated with changes in weather.

20 Claims, 10 Drawing Sheets

U.S. PATENT DOCUMENTS

| | | | |
|---|---|---|---|
| 5,233,174 | A | 8/1993 | Zmek |
| 5,262,696 | A | 11/1993 | Culp |
| 5,319,483 | A | 6/1994 | Krasinski et al. |
| 5,329,322 | A | 7/1994 | Yancey |
| 5,576,780 | A | 11/1996 | Yancey |
| 5,594,580 | A | 1/1997 | Sakanaka et al. |
| 5,777,719 | A | 7/1998 | Williams et al. |
| 5,872,644 | A | 2/1999 | Yamazaki et al. |
| 5,907,153 | A | 5/1999 | Gouch |
| 5,949,521 | A | 9/1999 | Williams et al. |
| 5,956,437 | A * | 9/1999 | Day et al. .................. 385/2 |
| 5,966,229 | A * | 10/1999 | Dodley et al. ............. 398/120 |
| 5,978,121 | A | 11/1999 | Fischer et al. |
| 6,016,212 | A | 1/2000 | Durant et al. |
| 6,023,057 | A | 2/2000 | Gaffard et al. |
| 6,122,084 | A * | 9/2000 | Britz et al. ................. 398/131 |
| 6,181,450 | B1 | 1/2001 | Dishman et al. |
| 6,239,888 | B1 * | 5/2001 | Willebrand ................ 398/129 |
| 6,278,100 | B1 * | 8/2001 | Friedman et al. ......... 250/201.9 |
| 6,323,980 | B1 * | 11/2001 | Bloom ...................... 398/129 |
| 6,381,055 | B1 * | 4/2002 | Javitt et al. ................ 398/131 |
| 6,384,944 | B1 | 5/2002 | Takayama et al. |
| 6,384,952 | B1 | 5/2002 | Clark et al. |
| 6,452,145 | B1 | 9/2002 | Graves et al. |
| 6,464,364 | B2 | 10/2002 | Graves et al. |
| 6,466,729 | B1 * | 10/2002 | Wagoner et al. ............ 385/140 |
| 6,639,710 | B2 * | 10/2003 | Kurczynski et al. ......... 359/290 |
| 6,643,466 | B1 * | 11/2003 | Helms et al. ............... 398/120 |
| 6,721,510 | B2 | 4/2004 | Graves et al. |
| 6,763,195 | B1 * | 7/2004 | Willebrand et al. ......... 398/115 |
| 6,987,255 | B2 * | 1/2006 | Smith ...................... 250/201.9 |
| 2002/0097509 | A1 | 7/2002 | Graves et al. |
| 2003/0001073 | A1 * | 1/2003 | Presby et al. ............. 250/201.9 |
| 2003/0067657 | A1 * | 4/2003 | Dimmler et al. ............ 359/159 |

OTHER PUBLICATIONS

Graves, J. Elon et al., "First Light for Hokupa'a: 36 Element Curvature AO System at UH," Proceedings of SPIE vol. 3353, Mar. 1998, pp. 34-43.

Graves, J.E. et al., "Latest Results from the University of Hawaii Prototype Adaptive Optics System," *Univ. Hawaii Laser Guide Star Adaptive Optics Workshop: Proceedings*—vol. 1 (Mar. 10-12, 1992), pp. 511-521.

Press Release: "LightPointe Granted New Free-Space Optics (FSO) Patent, Strengthens Intellectual Property on All-Optical FSO Systems," San Diego, CA, Oct. 17, 2002, 1 page.

Ribak, Erez N., "Deformable Mirrors," *Adaptive Optics for Astronomy*, D.M. Alloin and J.M. Mariotti (eds.), Kluwer Academic Publishers, Netherlands (1994), pp. 149-161.

Roddier, C. et al., "New optical testing methods developed at the University of Hawaii; results of ground-based telescopes and hubble space telescope" SPIE, vol. 1531, *Advanced Optical Manufacturing and Testing II* (1991), pp. 37-43.

Roddier, Francois et al., "A Simple Low-Order Adaptive Optics System for Near-Infrared Applications," Publications of the Astronomical Society of the Pacific, vol. 103, No. 659, Jan. 1991, pp. 131-149.

Roddier, Francois, "Astronomical adaptive optics with natural reference stars," University of Hawaii, Institute for Astronomy, 2680 Woodlawn Drive, Honolulu, Hawaii 96822, pp. 19-23.

Roddier, Francois, "Curvature sensing and compensation: a new concept in adaptive optics," *Applied Optics*, vol. 27, No. 7, Apr. 1, 1998, pp. 1223-1225.

Roddier, Francois, "Wavefront sensing and the irradiance transport equation," *Applied Optics*, vol. 29, No. 10, Apr. 1, 1990, pp. 1402-1403.

Safronov, Andrey G., "Bimorph Piezoelectric Structures in Laser and Astronomic Adaptive Optics," *Conference on Lasers and Electro-optics*, Europe 1996 (CLEO/Europe), Tuesday/91, CtuK4.

Zhao, Hua Wei, et al., "Prototype Bimorph Mirror for the AAT Adaptive Optics System," Proceedings of *SPIE*, vol. 3126, Adaptive Optics and Applications (1997), pp. 3884-3890.

PCT/US04/01331, International Search Report, Mar. 1, 2005, 2 pages.

*Adaptive Optics in Astronomy*, (Francois Roddier, Ed.) 1999, Cambridge University Press, pp. 11, 25.

* cited by examiner

FREE SPACE OPTICAL COMMUNICATION SYSTEM WITH POWER LEVEL MANAGEMENT

CROSS-REFERENCE TO RELATED APPLICATION

This application claims priority under 35 U.S.C. § 119(e) to U.S. Prov. Pat. Appl. No. 60/440,793, "Adaptive Optics Free Space Optical Communication System with Power Level Management," filed Jan. 16, 2003 by Chris Shelton et al. The contents of all of the foregoing are incorporated by reference in their entirety.

BACKGROUND OF THE INVENTION

1. Field of the Invention

The present invention relates generally to free space optical communications systems. More particularly, the present invention is directed towards power level management in free space optical communication systems.

2. Description of the Related Art

Free space optical communication systems are of interest as a technique to provide high data rate communications. In a free space optical communication system, a transmitter transmits data, typically at infrared wavelengths, to a line-of-sight receiver. Applications of free space optical communications systems include, for example, providing links to, from or between aircraft, spacecraft and ground vehicles and stations (including those that are water-based), as well as delivering fiber optical speed and services to sites, especially those that do not have direct fiber access to optical fiber networks.

Referring to FIG. 1A, a free space optical transceiver 10 at a first location generates a free space optical beam propagating to a corresponding transceiver 10 at a second location along an optical path 12. However, wind, thermal effects, and turbulent air motion causes a variation in air density along the length of the optical path. At any point in time, there will be regions of differing air density proximate the optical path 12. Moreover, over time periods of a fraction of a second, the air density may change along different regions of the optical path 12.

Referring to FIG. 1B, the regions of varying air density are sometime referred to as turbulence cells 2 or "turbules." The turbulence cells grow, shrink, and move around at rates of about 100 Hz. The variations in refractive index associated with turbulence cells in the atmosphere may be approximated in a geometrical optics approximation as a sequence of lenses along the optical path that cause beam wander, since portions of the beam will be directed off-axis by the lensing effect of the turbulence cells. Additionally, the effect of turbulence cells may be modeled as causing random variation in the wavefront. This leads to interference-induced phase and amplitude variations along the wavefront at the receiver, producing a speckle pattern across a receiver called scintillation.

Scintillation and weather can cause large variations in received power levels and variations in signal-to-noise ratios. This is one of the factors that has previously limited the applications of free space optics, as a substitute for conventional fiber optic links and otherwise.

Thus, there is a need for a free space optical communication system with improved control of beam characteristics and power levels.

SUMMARY OF THE INVENTION

An adaptive optical power regulator for use in a free space optical communication system is disclosed. The adaptive optical power regulator compensates for variations in received power level, such as those associated with scintillation, fog or clouds. In one embodiment, the adaptive optical power regulator includes an optical detector with a possibly non-linear transfer function, a controller, and a variable gain/loss module with a possibly non-linear transfer function, to regulate the optical power level or the logarithm or other non-linear function of the optical power level.

In one aspect of the invention, a receiver for a free space optical communication system includes an optical telescope, an (optional) adaptive optics system and an adaptive optical power regulator. The telescope receives incoming light that is encoded with data. The incoming light has traversed an atmospheric free space optical path to reach the telescope. The adaptive optics system senses the wavefront of the incoming light and at least partially corrects the wavefront. The adaptive optical power regulator adaptively regulates an average power level of the incoming light in response to variations in a loss of the atmospheric free space optical path.

In one embodiment, the adaptive optical power regulator includes a variable optical attenuator (VOA), an optical tap detector and a controller. The VOA optically attenuates the incoming light. The optical tap detector is positioned to detect the average power level of the attenuated light. The controller adaptively varies the optical attenuation of the VOA in response to the detected average power level. In one approach, the optical tap detector generates a voltage that is approximately a log function of the average power level of the attenuated light and the controller varies the optical attenuation approximately as an exponential function of the voltage. One advantage is that the loop gain can be approximately independent of the input optical power, resulting in fast response time over a wide range of input optical powers.

Other aspects of the invention include transceivers for bi-directional communication, systems and networks using such receivers and transceivers, and methods corresponding to all of the above.

BRIEF DESCRIPTION OF THE DRAWINGS

The invention has other advantages and features which will be more readily apparent from the following detailed description of the invention and the appended claims, when taken in conjunction with the accompanying drawings, in which:

DETAILED DESCRIPTION OF THE PREFERRED EMBODIMENTS

Figure 1A:
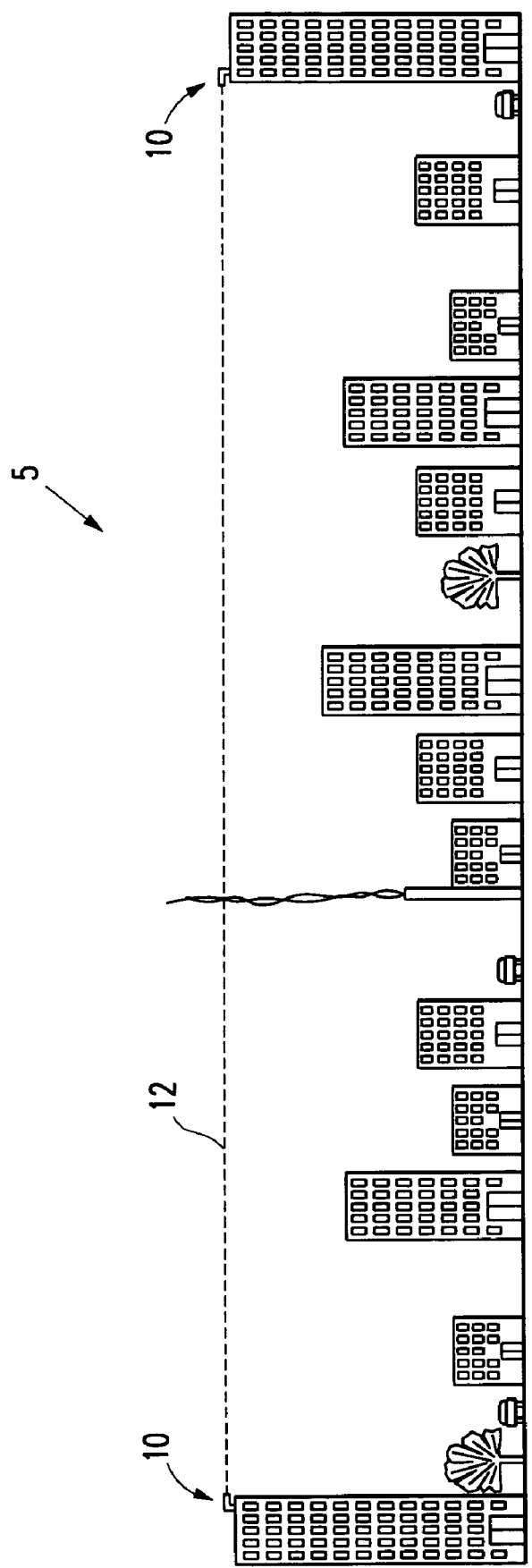
FIG. 1A is an illustrative drawing of a free space optical communication system.
Figure 1B:
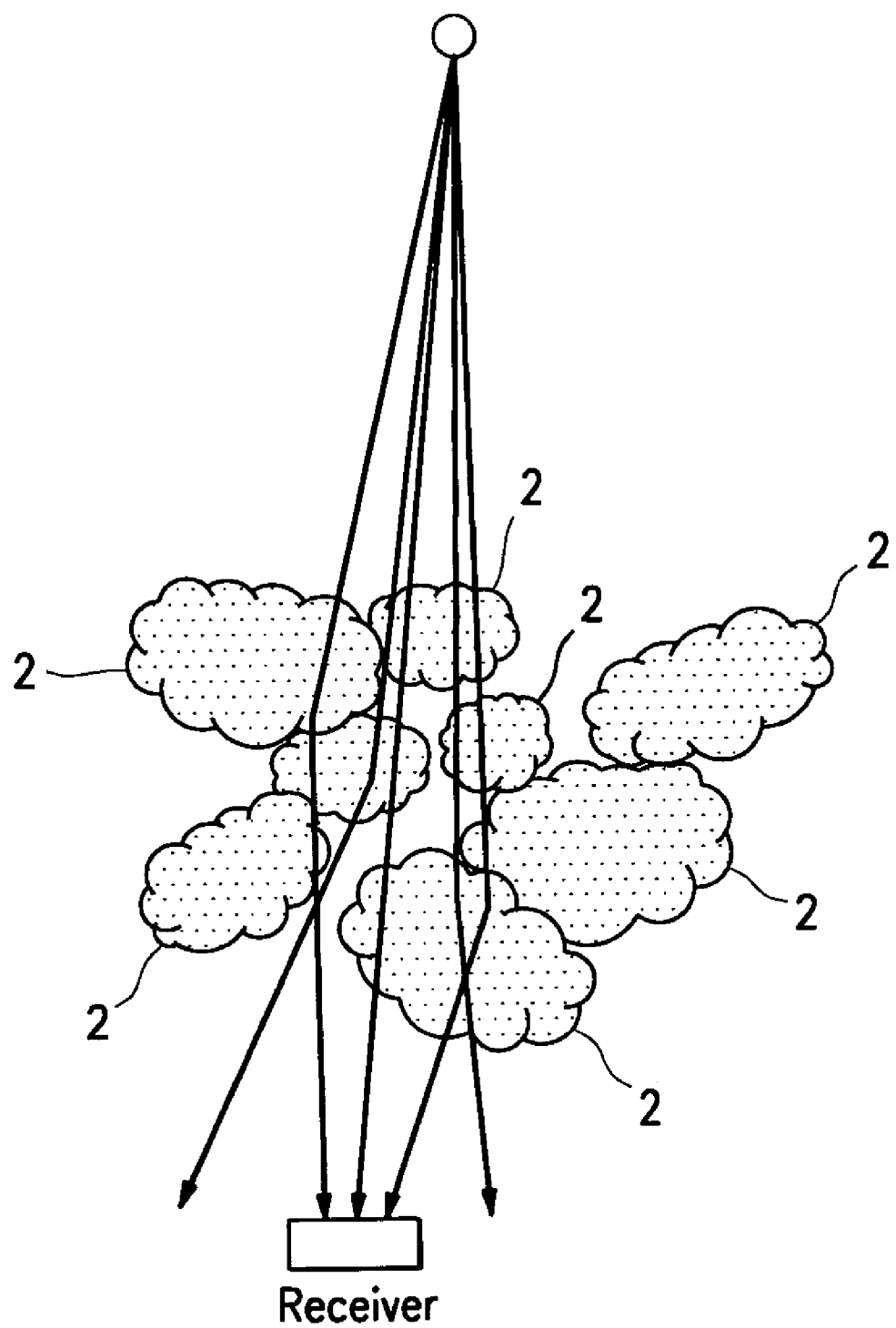
FIG. 1B is an illustrative drawing of beam wander and scintillation caused by turbulence microcells.
Figure 2:
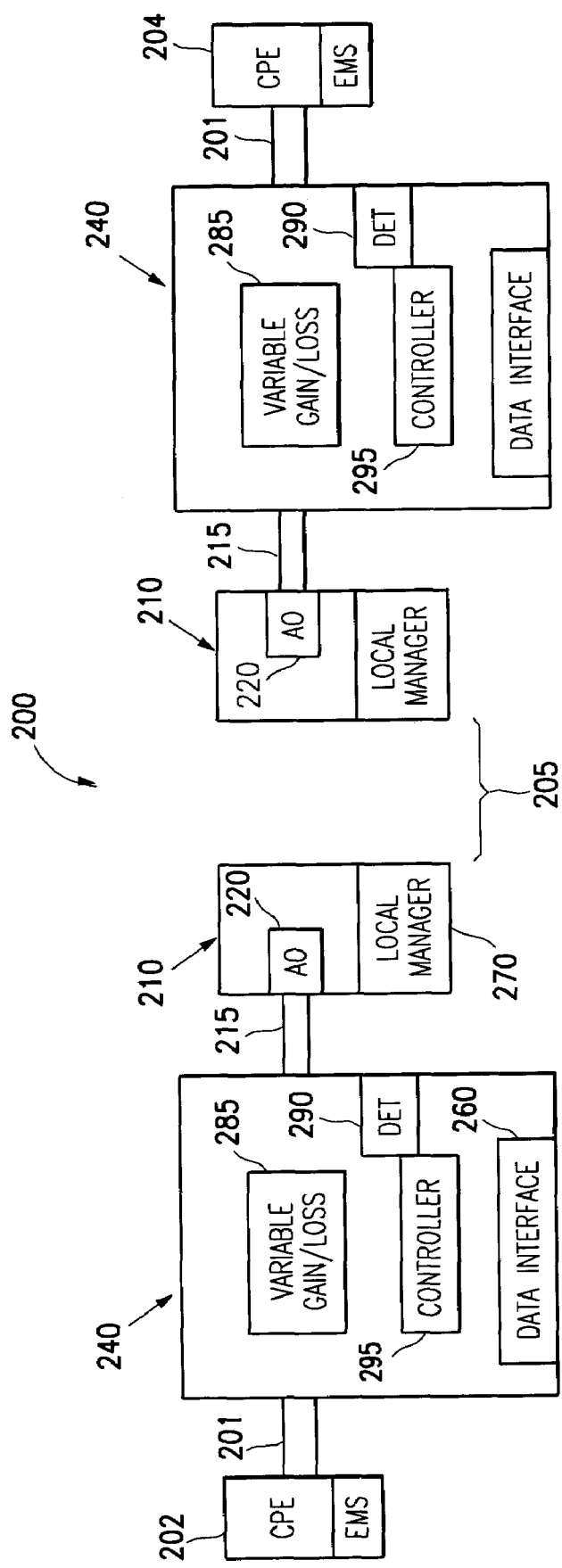
FIG. 2 is a block diagram of an illustrative free space optical communication system including adaptive attenuation in accord with the present invention.

FIG. 2 is a block diagram of one embodiment of a free space optics (FSO) communication system 200 in accord with the present invention. This particular FSO communication system 200 is designed to communicate data over a free space optical data link 205 between nodes 203 of optical networks 202 and 204 that are spaced apart from each other by a significant distance such that the effect of the atmosphere is significant, e.g., about one kilometer or more for many commercial applications. In the present invention, first and second optical telescopes 210 are pointed at each other. Each optical telescope 210 includes optical components for directing and focusing an optical beam at the other optical telescope 210.

Optical networks 202 and 204 are commonly known in the art of optical networking as "customer premise equipment" (CPE) networks. The FSO communication system 200 preferably is compatible with the requirements of the CPE networks 202 and 204. It is desirable that the free space optical communication system 200 emulate many of the characteristics of a fiber-optic link between optical networks 202 and 204 such that FSO communication 200 may be used to replace a conventional fiber-optic or other type of communications link.

In one embodiment of the present invention, FSO communication system 200 has fiber optic interfaces 201 at either end of the system to permit a direct optical connection to a CPE 202 or 204. However, the atmosphere along a free space optical data link 205 has time varying and spatially varying variations in density, typically occurring at a rate of about 1 kHz for turbulent cells. As a result, if only simple geometrical optics are used, the beam will tend to wander and scintillation patterns at the receiver may cause large variations in received power level at the receiving telescope. Additionally, the fog and particulate content of the atmosphere depends upon the weather, leading to variations in optical absorption of the free space optical data link 205.

In some free space optics communication systems, some of the effects of scintillation are mitigated by using adaptive optics to correct the wavefront of the incoming light and/or pre-correct the wavefront of outgoing light to compensate for the refractive index aberrations of the atmosphere along the optical light path. Correcting the wavefront of incoming light at the receiving telescope facilitates focusing the light and increasing collection efficiency. Pre-correcting the wavefront of outgoing light (e.g., deforming it at the source to account for the non-ideality of the atmospheric medium) reduces beam wander and scintillation patterns. Consequently, in this example, each receiving telescope includes an adaptive optics system 220. Exemplary adaptive optics systems are described in U.S. patent application Ser. No. 09/892,913, "Atmospheric Optical Data Transmission System," filed Jun. 26, 2001 by J. Elon Graves and Malcolm J. Northcott; U.S. patent application Ser. No. 09/769,988, "Deformable Curvature Mirror," filed Jan. 25, 2001 by J. Elon Graves and Malcolm J. Northcott, issued on Oct. 15, 2002 as U.S. Pat. No. 6,464,364; and U.S. patent application Ser. No. 09/579,786, "Method and Apparatus for Wavefront Sensing," filed May 26, 2000 by J. Elon Graves and Malcolm J. Northcott, issued on Sep. 17, 2002 as U.S. Pat. No. 6,452,145. The contents of all of the foregoing are incorporated by reference.

Figure 3:
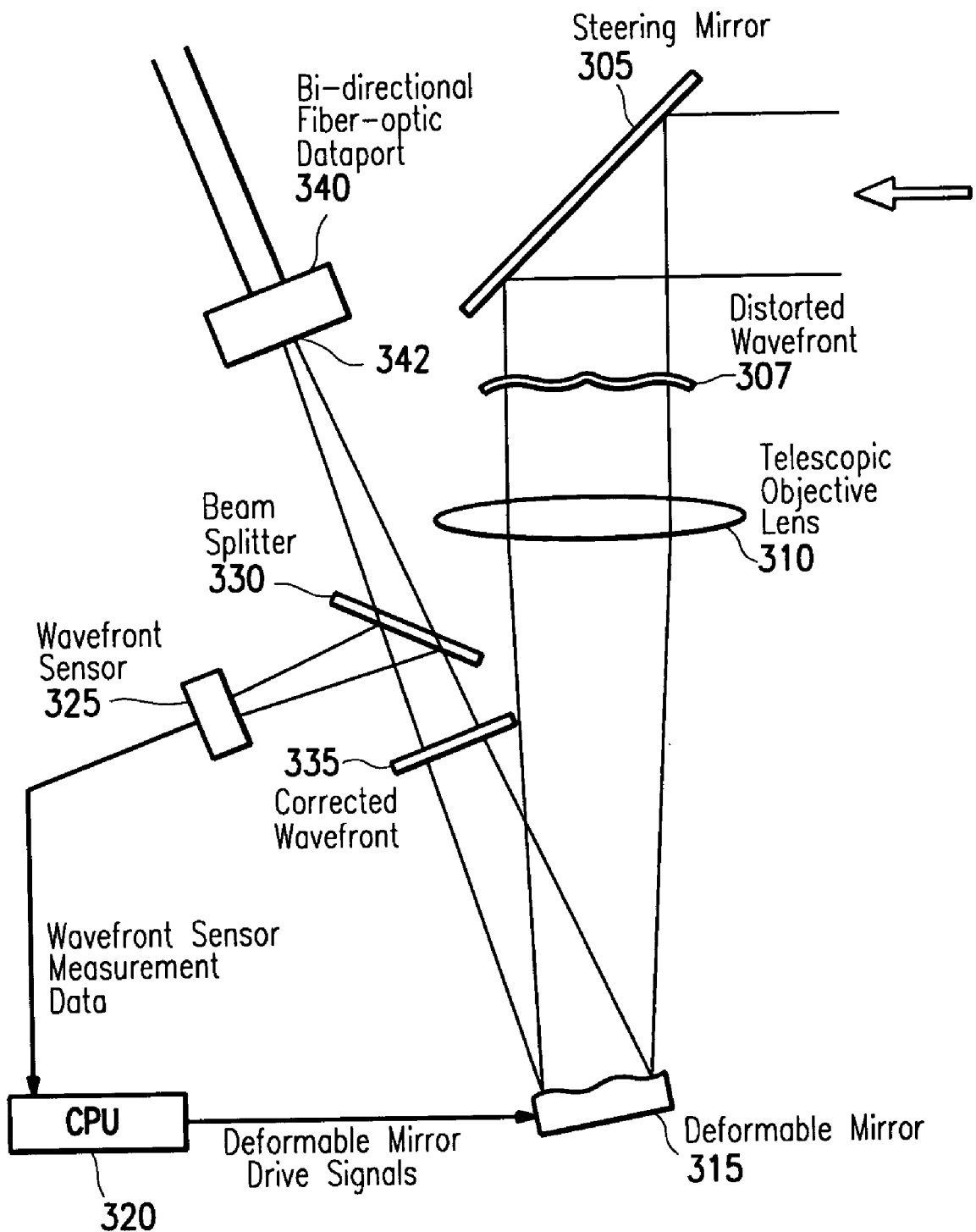
FIG. 3 is an illustrative diagram of an adaptive optics system for use in a free space optical communication system.

FIG. 3 is an illustrative block diagram showing in more detail some of the components of an adaptive optics system for use in an individual telescope. A steering mirror 305 directs light to/from the orifice of the telescope. For incoming light, the wavefront is distorted by turbulence, resulting in a distorted wavefront 307. A lens 310 directs the incoming light to a deformable mirror 315. The deformable mirror may, for example, comprise a plurality of electrically movable sections that permit electronic control of the shape of the mirror. The deformation of the deformable mirror 315 is controlled by a local computer 320 (e.g., a digital controller and/or analog circuitry) that selects the geometric deformation of the deformable mirror based upon measurements of the wavefront. These measurements are taken from a wavefront sensor 325 that taps off a portion of the light via a beam splitter 330. Wavefront sensor 325 measures a residual distortion or error in the wavefront. The error signal is input to computer 320, which calculates a correction signal for the deformable mirror.

As a consequence of the adaptive optics, a corrected wavefront 335 is reflected from the deformable mirror towards a bi-directional fiber-optic dataport 340. Fiber optic dataport 340 may, for example, comprise an optical coupler for coupling light between an imaging point 342 aligned with the deformable mirror and a receive optical fiber and a transmit optical fiber of the CPE side of dataport 340, although it will be understood that a variety of optical coupler configurations may be employed. Conversely, for outgoing waves emanating from the fiber-optic dataport, the deformable mirror 315 will pre-deform the wavefront of outgoing light to pre-correct for known aberrations along the light path.

For free space optical communications with moving endpoints (mobile applications), it may be advantageous to split the bi-directional dataport 340 into separate transmit and receive ports, with a controlled effective separation. This enables pointing the transmit beam ahead of the apparent current position of the other endpoint, to the future actual position where it will be when the beam arrives. This "point-ahead" technique particularly applies to links to satellites in low Earth orbit (LEO). It should also be noted that, although this example concerns bi-directional data transmission, the techniques described are also applicable to unidirectional data links.

In an adaptive optics system similar to that of FIG. 3 it is desirable to correct the wavefront at a rate significantly faster than the rate of atmospheric changes, e.g., about a factor of ten or more higher. Since turbulence microcells in the atmosphere change at a rate of about 1 kHz, it is desirable that the deformable mirror make adjustments at a rate of about a factor of ten or more greater, e.g., at about 10 kHz or greater.

Figure 6:
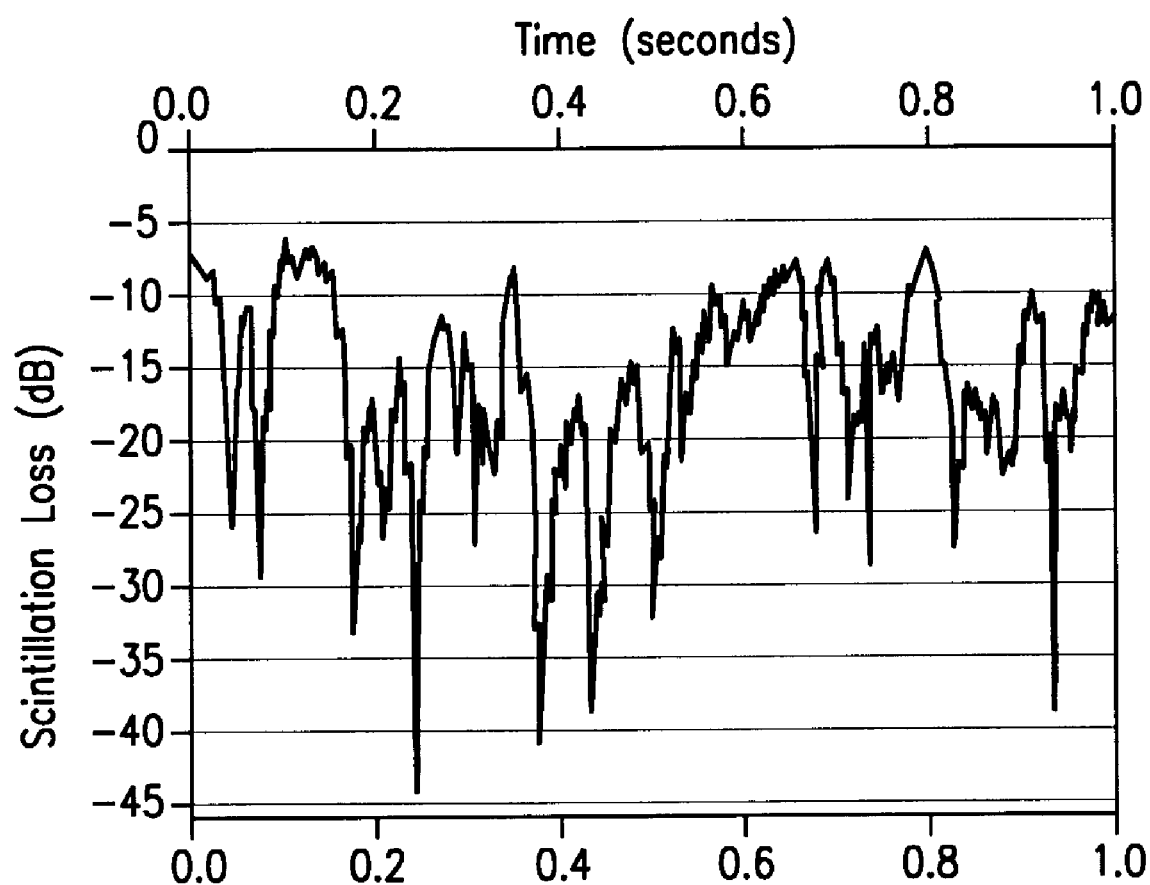
FIG. 6 illustrates scintillation loss versus time for a free space optical communication system without adaptive optics.
Figure 7:
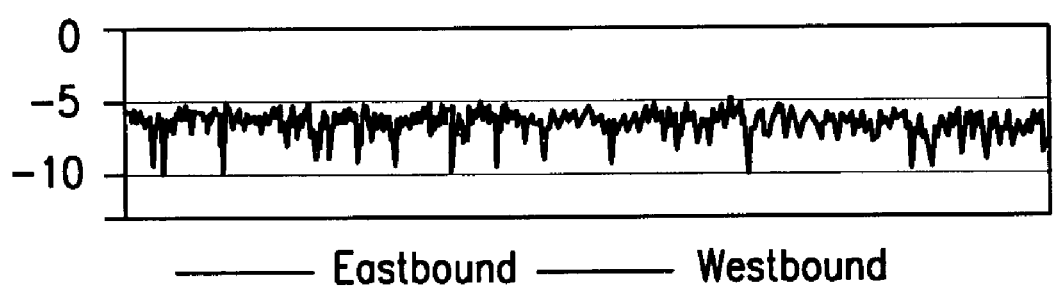
FIG. 7 illustrates residual variations in scintillation loss versus time for a free space optical communication system that uses adaptive optics.
Figure 8:
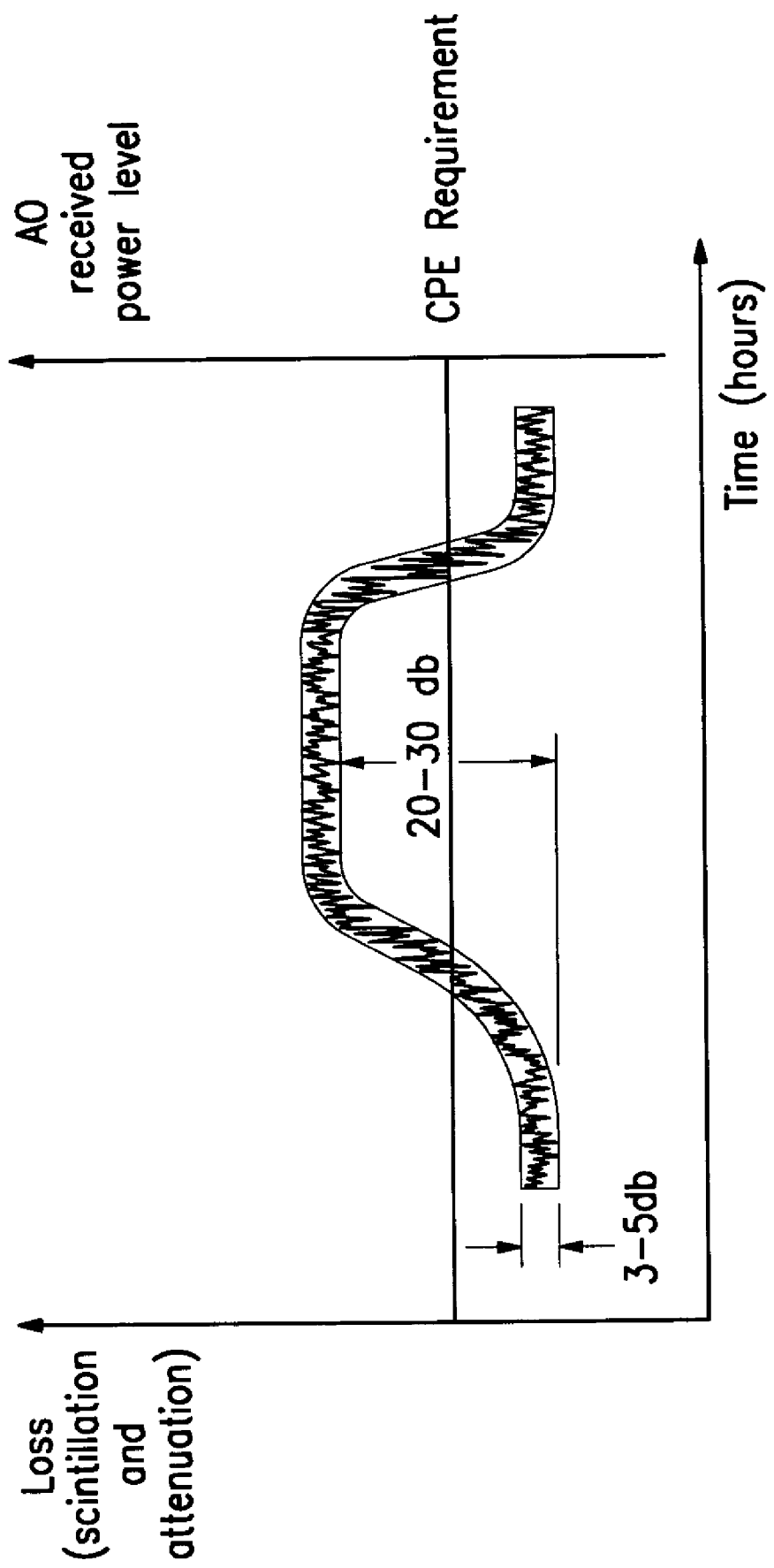
FIG. 8 illustrates the combined variation in loss associated with changes in weather conditions and residual scintillation loss in a free space optical communication system that uses adaptive optics.

Some aspects of the present invention may be understood in regards to FIGS. 6-8. Referring to FIG. 6, the simulated performance of a 2 kilometer free space optics link is shown without the use of adaptive optics. Scintillation and beam wander cause deep fade outs, e.g., 35 dB variations in average power level. FIG. 7 shows a simulation for the same link except using adaptive optics to reduce the effects of scintillation. Investigations by the inventors indicate that the adaptive optics of a bi-directional FSO communication system is capable of eliminating or substantially reducing deep fade outs associated with beam wander and speckle. However, the residual scintillation-induced intensity variations can still be on the order of 5-10 dB over time scales that are small compared to one second. Moreover, changes in weather can cause another 10-30 dB or more variation in loss, whether or not adaptive optics is employed. Consequently, as indicated in FIG. 8, even with adaptive optics, the received power level may vary appreciably over short time scales due to scintillation effects and also change more slowly but dramatically when fog or clouds intervene.

Referring again to FIG. 2, in the present invention, an adaptive optical power regulator 240 is included to provide dynamic control of the effective attenuation of link 205, thereby regulating the average power level coupled into a CPE. In one embodiment, adaptive optical power regulator 240 is configured as a separate module that is linked between a CPE and a fiber optic dataport 215 of the adaptive optics 220. However, in an alternate embodiment, adaptive optical power regulator 240 is integrated into the adaptive optics system. Adaptive optical power regulator 240 includes a variable optical gain/loss 285, an optical detector 290, and an electronic control module 295. Examples of optical components having a controllable optical loss or gain include variable optical attenuators, variable gain optical amplifiers, fiber couplers with intentional, controlled mismatch, and various combinations of the foregoing.

In one embodiment, the adaptive optical power regulator 240 measures the average power level of the incoming light signal and adjusts an optical attenuation to regulate the effective optical link loss. As used in this application, "average power level", or simply "power level" is an average power on a time scale that is large with respect to the time period associated with an individual data time slice, but short compared to scintillation time scales.

Some of the benefits of adaptive optical power regulator 240 are that it may be used to regulate the effective attenuation of link 205 to be within a predefined range, or that it may be used to regulate the average power level of the incoming beam coupled to an optical fiber network connection 201 of a customer premises.

In one embodiment, a data interface 260 is used to input control commands to the optical attenuation controller via a local manager 270 of the adaptive optics system. A simple management protocol (SMP), command line interface (CLI), or other management interface may be used to input the control commands. As one example, a desired power level may be input to local manager 270, which in turn uses the data interface 260 to adjust the power set point.

Figure 4:
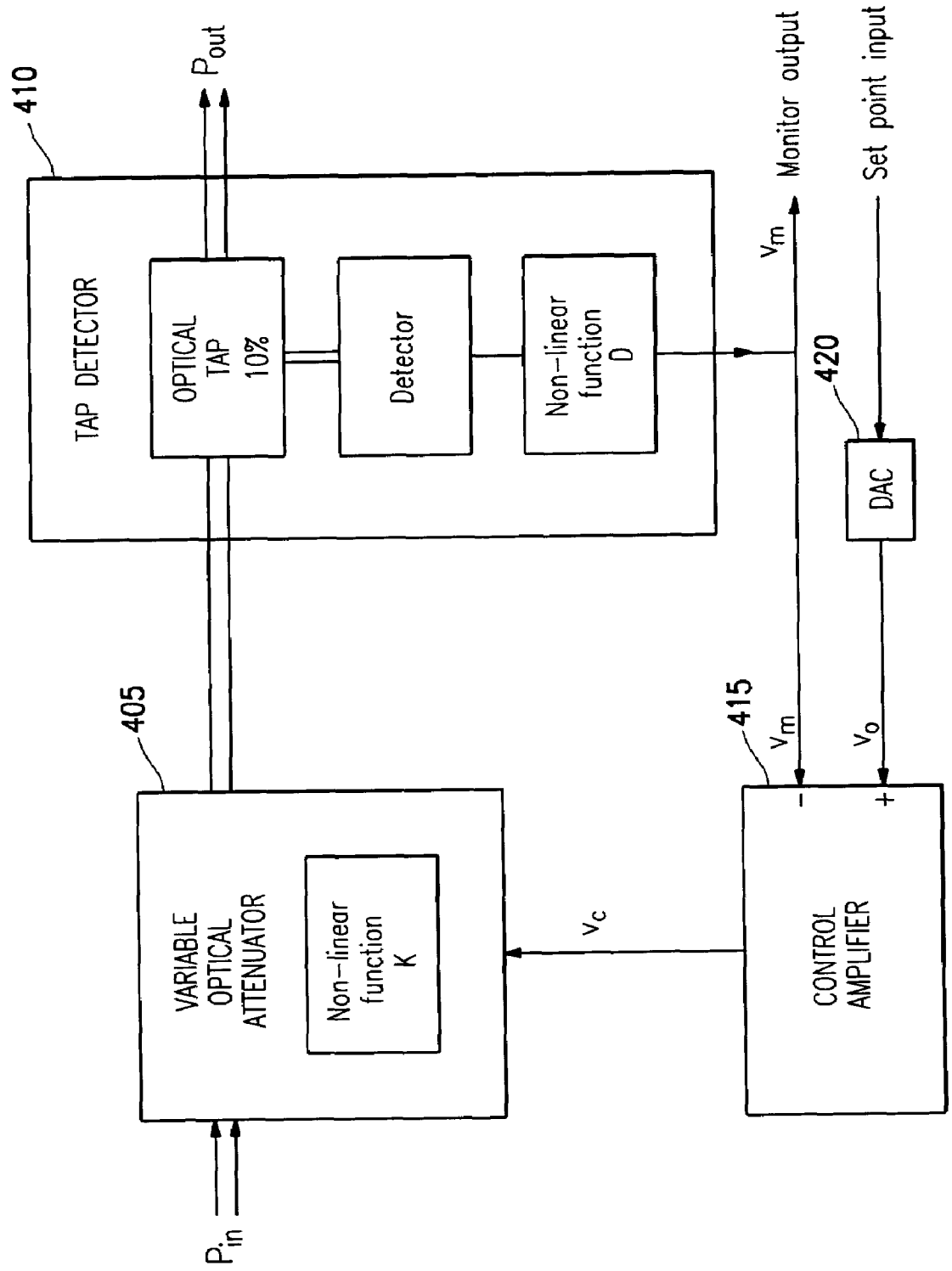
FIG. 4 is a block diagram of one embodiment of an adaptive attenuator.

Referring to FIG. 4, in one embodiment, the adaptive optical power regulator 240 includes a variable optical attenuator 405 with electrical control input $v_c$, an optical tap/detector 410 to tap off a portion of the output $P_{out}$ of VOA 405 (10% tap in this example) and convert that portion to an electrical signal $v_m$. The tap detector 410 is described by a possibly non-linear relationship $$v_m = D(P_{out})$$

and the variable optical attenuator 405 is described by a possibly non-linear relationship $$P_{out} = K(v_c) P_{in},$$

where $P_{in}$ and $P_{out}$ are the input and output optical power levels. A combined tap/detector assembly, such as those manufactured by DiCon Fiberoptics, Inc. of Richmond, Calif. may be used. A logarithmic converter, such as the AD8304 manufactured by Analog Devices of Norwood, Mass. may be used to provide the non-linear function D. The output of tap/detector 410 is one input to a control amplifier 415. The other input to the control amplifier 415 is a set point input from, for example, a digital to analog converter (DAC) 420. Control amplifier 415 compares the tap detector output $v_m$ to the set point voltage $v_o$ from DAC 420 and generates an appropriate control voltage $v_c$ for VOA 405.

It is desired that VOA 405 has a sufficient range of attenuation to compensate for weather- and scintillation-induced changes in optical attenuation in the optical path. Consequently, an attenuation range of at least 20-30 dB is desired and more is preferred. To respond to variations in scintillation loss, adaptive optical power regulator 240 responds at a rate faster than scintillation and with sufficient fidelity to prevent significant overshoot/undershoot. An overall response time of less than one millisecond is desired, with 0.2 millisecond or less being preferred. A span of 1 dB or less is typically desirable for residual output optical power variations after regulation.

The combination of wide attenuation range and fast response is a classically difficult problem. A figure of merit M may be defined for an optical power level regulator as $$M = \text{(fractional change in input power)}/\text{(fractional change in output power)}.$$

An M of 10 means that a 10% change in input power results in a 1% change in output power. Larger M is generally desirable. If the behavior of control amplifier 415 is described by $$v_c = -A(v_m - v_o),$$

then it is can be shown that $$M = 1 + AK'D'P_{in}.$$

where K' is the slope of the attenuator transfer function and D' is the slope of the tap detector transfer function, given by $$K' = dK/dV_c,$$

$$D' = dD/dP_{out}.$$

If the tap detector and the attenuator both have linear transfer relationships, then K' and D' are both constants, and the figure of merit M and hence the loop gain, are proportional to input optical power $P_{in}$. If the range of input optical power is 30 dB, then the loop gain changes by 1000:1 and attaining high speed response everywhere over this range is difficult.

If on the other hand, suitable non-linear functions are chosen for D and K such that the product D'K' is proportional to $1/P_{in}$, then a loop gain and fast response speed independent of input light level is more easily attained. In one embodiment of the invention, a logarithmic function is chosen for the tap detector transfer function:

$$D(P_{out}) = v_D \log(P_{out}/P_D), \text{ where } v_D \text{ and } P_D \text{ are circuit constants,}$$

and an exponential relationship is chosen for the variable attenuator transfer function:

$$K(v_c) = \exp((v_c - v_a)/v_b), \text{ where } v_a \text{ and } v_b \text{ are circuit constants.}$$

In this case, it can be shown that $$M=1+A(v_D/v_b).$$

This is a constant which is independent of light level and which can be made usefully large.

Figure 5:
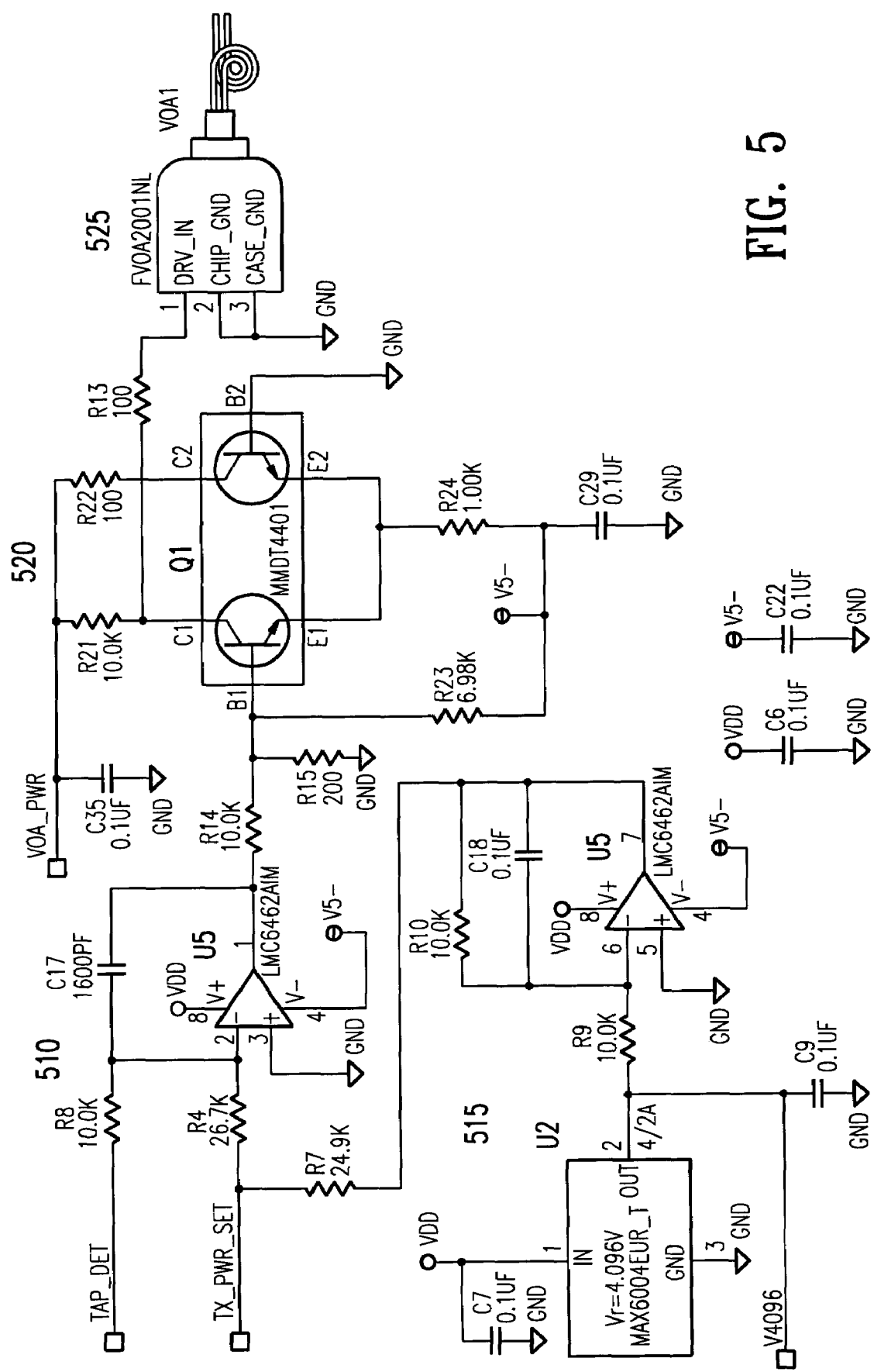
FIG. 5 is a circuit diagram of a control circuit for an adaptive attenuator.

Commercially available high speed VOAs, such as the APN-00001-B FVOA2001 manufactured by Lightconnect, Inc., of Newark, Calif., typically have a nonlinear transfer function, but most commonly this transfer function does not exactly fit the form shown above. Additional transfer function shaping is used to more fully obtain the benefits described. Referring to FIG. 5, in one embodiment, control amplifier 415 comprises an op-amp integrator circuit 510 that compares the outgoing light power to a preset desired power level, and a voltage reference section 515. Variable optical attenuator 405 comprises a dual transistor quasi-exponential circuit 520, and the commercially available high speed VOA 525. The circuit constants of the quasi-exponential circuit 520 are adjusted so that the combined nonlinear transfer curve of circuit 520 and VOA 525 matches an exponential curve to within a usefully small error. In the embodiment of FIG. 5, an input power range of 30 dB gives rise to a manageable 4:1 change in loop gain, rather than the 1000:1 resulting from a linear controller. While the embodiment of FIG. 5 shows control implemented as an analog feedback loop, digital or mixed analog/digital implementations can also be used.

Referring again to FIG. 2, the residual scintillation and weather effects result in a time varying change in the effective attenuation of free space optical link 205 and a corresponding variance in average power levels. However, a CPE may have specific power level requirements for incoming light to an optical network. A CPE may, for example, detect a loss of signal (LOS) if a detected average incoming average power level is below a threshold power level. Alternatively, a CPE may have a maximum input power level determined by nonlinear effects in amplifiers or other components. Additionally, for many CPE's, the effective attenuation of the free space link 205 must be kept within a predefined link loss budget. Thus, depending upon the requirements of the CPE, there may be a lower bound on average power level, an upper bound to average power level, or additional limitations on variations in link loss budget.

Figure 9:
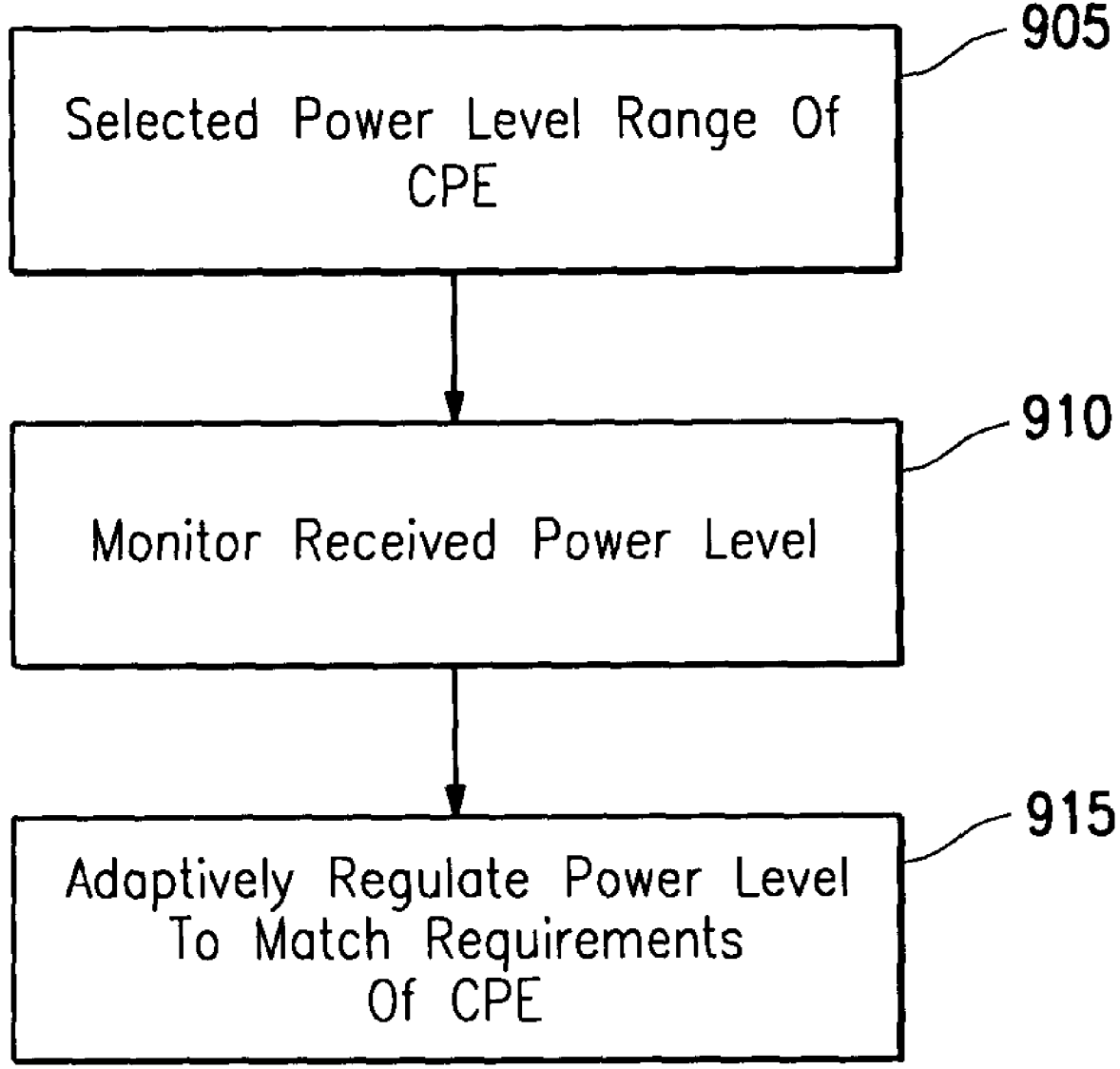
FIG. 9 is a flow chart illustrating a method of adaptive power level control.

One benefit of the present invention is that the attenuation response can be selected for the requirements of a particular CPE. Referring to the flow chart of FIG. 9, in one embodiment, a desired power level range is selected 905 to match the requirements of the CPE. The actual average power level is monitored 910. The attenuation of the adaptive optical power regulator is adapted 915 so that the average power level matches the requirements of the CPE.

Figure 10:
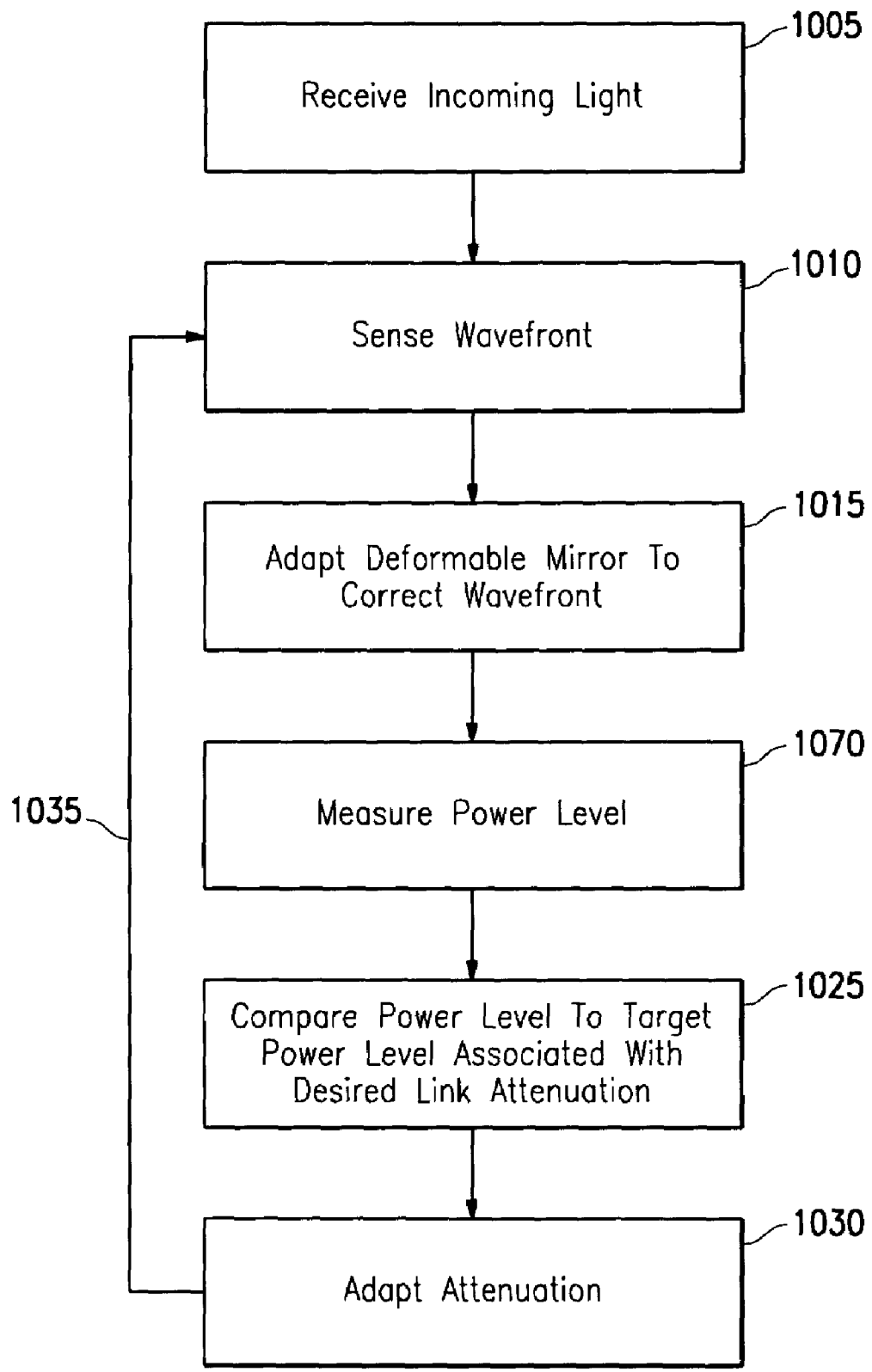
FIG. 10 is a flow chart showing in more detail a method of adapting attenuation to control receive power level.

FIG. 10 is a more detailed flow chart of one method of operation of the present invention. Incoming light is received 1005 at a telescope. The wavefront of incoming light is sensed 1010 and a deformable mirror adjusted 1015 to beneficially alter the wavefront of incoming and outgoing light. In one embodiment, the power level of incoming light is measured 1020 by the attenuation controller. The power level is compared 1025 to a target power level associated with a desired link attenuation. If the power level is out of a desired range, the attenuation/loss of the optical attenuation controller is adjusted 1030.

Additionally, some of the power level control to adapt to changes in weather conditions may be supplied by changing the focus of a lens or other optical element within the telescope. For example, in one embodiment, the adaptive optical power regulator compensates for scintillation loss while changes in weather conditions (e.g., fog versus clear skies) are compensated for by changing the effective divergence of transmitted beams, such as by adjusting a zoom or other lens or by intentionally mismatching the received beam to its fiber or detector. Some of the power level control may be implemented by intentionally biasing an adaptive optic system, as illustrated by arrow 1035 in FIG. 10. It will also be understood that variable optical attenuation from any and all sources may be cascaded as needed to provide additional control range. For example, two commercial VOAs may be connected optically in series and driven from the same control voltage to double the input power range in dB.

The adaptive optical power regulator of the present invention can be used with a variety of different telescope configurations and applications. For example, although the examples shown above include adaptive optics, the adaptive optical power regulator can also be used in free space optical communication systems that do not include adaptive optics. As another example, the communications link can be bi-directional or unidirectional. It can also be ground-to-ground (including to/from water-based locations), ground-to-air, air-to-air, space-to-ground or any other combination. It can be a stand-alone link, as opposed to a link within a larger network as shown in FIG. 2. Each of the transmitter and receiver can be stationary or mobile. The optical source at the transmitter can be a direct feed from an optical fiber, an internally modulated source, or an externally modulated source. At the receiver, the received optical signal can be coupled to an optical fiber, waveguide, or detection system (including direct detection and heterodyne detection). These are but a few of the different applications in which an adaptive optical power regulator can be used.

With a bi-directional data transmission system, the transmitted and received signals at each transceiver typically are distinguishable (separable) to avoid mixing the transmitted data-encoded light with the received data-encoded light, such as might occur by backscatter as a result of heavy fog. Different physical methods can be used to distinguish/separate the incoming and the outgoing light beams from each other, including the following broad categories: wavelength multiplexing, polarization multiplexing, time domain multiplexing, angular multiplexing, code division multiplexing and spatial multiplexing. As a final example, the optical power regulation may occur partially or entirely at the transmitter rather than at the receiver, or may be distributed along the communications link.

While particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A free space optical data communication method, comprising:

receiving incoming light at a telescope, the incoming light encoded with data and traversing an atmospheric free space optical path to the telescope, wherein a phase of a wavefront of the incoming light is at least partially pre-corrected before traversing the atmospheric free space optical path;

sensing the wavefront of the incoming light encoded with data and at least partially correcting the phase of the wavefront;
optically attenuating the incoming light;
detecting an average power level of the attenuated light;
generating a voltage that is approximately a log function of an average power level of the attenuated light; and
varying the optical attenuation approximately as an exponential function of the voltage to adaptively regulate the average power level of the incoming light in response to variations in a loss of the atmospheric free space optical path.

2. The method of claim 1 wherein the regulated average power level is maintained within a predefined power range.

3. The method of claim 2 wherein the atmospheric free space optical path is part of an optical network and the predefined power range is defined by requirements of the optical network.

4. The method of claim 1 further comprising:
recovering the data from the regulated incoming light.

5. The method of claim 1 further comprising:
optically coupling the regulated incoming light into an optical fiber.

6. A receiver for an adaptive optics free space optical communication system, the receiver comprising:
an optical telescope for receiving incoming light encoded with data, the incoming light traversing an atmospheric free space optical path to the telescope, wherein a phase of a wavefront of the incoming light is at least partially pre-corrected via an adjustable phase device before traversing the atmospheric free space optical path;
an adaptive optical power regulator optically coupled with the optical telescope for adaptively regulating an average power level of the incoming light in response to variations in a loss of the atmospheric free space optical path, the adaptive optical power regulator comprising:
a variable optical attenuator having a controllable attenuation for optically attenuating the incoming light;
an optical tap detector positioned to detect the average power level of the attenuated light, the optical tap detector generating a voltage that is approximately a log function of the average power level of the attenuated light; and
a controller coupled to the optical tap detector and the variable optical attenuator, the controller varying the optical attenuation approximately as an exponential function of the voltage to adaptively regulate the optical attenuation in response to the detected average power level; and
an adaptive optics system optically coupled with the optical telescope for sensing the wavefront of the incoming light encoded with data and at least partially correcting the phase of the wavefront.

7. The receiver of claim 6 wherein the adaptive optical power regulator is fast enough to at least partially compensate for scintillation-induced variations in the average power level.

8. The receiver of claim 6 wherein the adaptive optical power regulator has a response time of 0.2 milliseconds or faster.

9. The receiver of claim 6 wherein the adaptive optical power regulator has a sufficient dynamic range to compensate for fog-induced variations in the average power level.

10. The receiver of claim 6 wherein the adaptive optical power regulator has a dynamic range of at least 20 dB.

11. The receiver of claim 6 wherein the adaptive optical power regulator is programmable.

12. An adaptive optics free space optical communication system comprising:
a first transceiver and a second transceiver for bidirectionally transmitting light encoded with data across an atmospheric free space optical path, wherein:
each transceiver comprises an optical telescope for receiving incoming light encoded with data transmitted by the other transceiver;
the first transceiver comprises an adaptive optical power regulator optically coupled with the optical telescope for adaptively regulating an average power level of the incoming light in response to variations in a loss of the atmospheric free space optical path, the adaptive optical power regulator comprising:
a variable optical attenuator having a controllable attenuation for optically attenuating the incoming light;
an optical tap detector positioned to detect the average power level of the attenuated light, the optical tap detector generating a voltage that is approximately a log function of the average power level of the attenuated light;
a controller coupled to the optical tap detector and the variable optical attenuator, the controller varying the optical attenuation approximately as an exponential function of the voltage to adaptively regulate the optical attenuation in response to the detected average power level;
the first transceiver comprises an adaptive optics system optically coupled with the optical telescope for sensing the wavefront of the incoming light encoded with data and at least partially correcting a phase of the wavefront; and
the second transceiver comprises an adaptive optics system optically coupled with the optical telescope for at least partially pre-correcting the phase of the wavefront of the light encoded with data to be transmitted to the first transceiver.

13. The communication system of claim 12 wherein each transceiver is a node of an optical network.

14. The communication system of claim 13 further comprising:
a local network manager coupled to each transceiver for sending commands to the transceiver for regulating the average power level.

15. The communication system of claim 13 wherein:
the optical network complies with a fiber optic network protocol; and
adaptive optical power regulator controls the average power level according to the fiber optic network protocol.

16. The communication system of claim 12 wherein:
the adaptive optics system of the first transceiver is further for at least partially pre-correcting the phase of the wavefront of the light encoded with data to be transmitted to the second transceiver;
the adaptive optics system of the second transceiver is farther for sensing the waveficont of the incoming light encoded with data and at least partially correcting the phase of the wavefront; and
the second transceiver comprises an adaptive optical power regulator optically coupled with the optical telescope for adaptively regulating an average power level of the incoming light in response to variations in a loss of the atmospheric free space optical path.

17. A free space optical data communication method, comprising:
- at least partially pre-correcting a phase of a wavefront of data-encoded light in response to aberrations along a free space optical path between two transceivers;
- transmitting the partially pre-corrected data-encoded light across the free space optical path;
- receiving the transmitted data-encoded light;
- at least partially correcting a phase of a wavefront of the received data-encoded light in response to aberrations along the free space optical path;
- optically attenuating the received data-encoded light;
- detecting an average power level of the attenuated light;
- generating a voltage that is approximately a log function of an average power level of the attenuated light; and
- varying the optical attenuation approximately as an exponential function of the voltage to adaptively regulate the power level of the received data-encoded light in response to time-varying losses along the free space optical path.

18. An adaptive optics free space optical communication system comprising:
- a first transceiver and a second transceiver for transmitting data-encoded light across a free space optical path from the first transceiver to the second transceiver, wherein:
- the first transceiver comprises:
  - an adaptive optics system for at least partially pre-correcting a phase of a wavefront of data-encoded light in response to aberrations along the free space optical path; and
- the second transceiver comprises:
  - an adaptive optics system for at least partially correcting a phase of a wavefront of the received data-encoded light in response to aberrations along the free space optical path; and
  - an adaptive optical power regulator for adaptively regulating a power level of the received data-encoded light in response to variations in a loss of the free space optical path, the adaptive optical power regulator comprising:
    - a variable optical attenuator having a controllable attenuation for optically attenuating the received data-encoded light;
    - an optical tap detector positioned to detect the average power level of the attenuated light, the optical tap detector generating a voltage that is approximately a log function of the average power level of the attenuated light; and
    - a controller coupled to the optical tap detector and the variable optical attenuator, the controller varying the optical attenuation approximately as an exponential function of the voltage to adaptively regulate the optical attenuation in response to the detected average power level.

19. A free space optical data communication method, comprising:
- determining an adaptive optics wavefront correction in response to aberrations along a free space optical path between two transceivers;
- receiving first data-encoded light transmitted across the free space optical path and applying the adaptive optics wavefront correction to at least partially correct a phase of a wavefront of the first data-encoded light;
- optically attenuating the first data-encoded light;
- detecting an average power level of the attenuated light;
- generating a voltage that is approximately a log function of an average power level of the attenuated light;
- varying the optical attenuation approximately as an exponential function of the voltage to adaptively regulate the power level of the first data-encoded light in response to time-varying losses along the free space optical path; and
- applying the adaptive optics wavefront correction to at least partially pre-correct a phase of a wavefront of second light and transmitting the second light across the free space optical path.

20. A transceiver for adaptive optics free space optical communication across a free space optical path comprising:
- an adaptive optics system for determining an adaptive optics wavefront correction in response to aberrations along a free space optical path between two transceivers, for applying the adaptive optics wavefront correction to at least partially correct a phase of a wavefront of first data-encoded light received across the free space optical path, and further for applying the adaptive optics wavefront correction to at least partially pre-correct a phase of a wavefront of second light to be transmitted across the free space optical path; and
- an adaptive optical power regulator for adaptively regulating a power level of the first data-encoded light in response to variations in a loss of the free space optical path, the adaptive optical power regulator comprising:
  - a variable optical attenuator having a controllable attenuation for optically attenuating the first data-encoded light;
  - an optical tap detector positioned to detect the average power level of the attenuated light, the optical tap detector generating a voltage that is approximately a log function of the average power level of the attenuated light; and
  - a controller coupled to the optical tap detector and the variable optical attenuator, the controller varying the optical attenuation approximately as an exponential function of the voltage to adaptively regulate the optical attenuation in response to the detected average power level.

* * * * *

UNITED STATES PATENT AND TRADEMARK OFFICE
CERTIFICATE OF CORRECTION

PATENT NO.        : 7,286,766 B2                                          Page 1 of 1
APPLICATION NO.   : 10/417471
DATED             : October 23, 2007
INVENTOR(S)       : J. Christopher Shelton, Malcolm J. Northcott and Raymond W. Tang It is certified that error appears in the above-identified patent and that said Letters Patent is hereby corrected as shown below:

Column 10, line 60; replace "farther" with --further--

Column 10, line 60, replace, "waveficont" with --wavefront--

Column 11, line 3, replace, "waveficont" with --wavefront--

Signed and Sealed this

Eleventh Day of March, 2008

JON W. DUDAS
*Director of the United States Patent and Trademark Office*